(12) United States Patent
Wu et al.

(10) Patent No.: US 8,819,707 B2
(45) Date of Patent: Aug. 26, 2014

(54) METHODS AND SYSTEMS FOR IMPORTING A DEVICE DRIVER INTO A GUEST COMPUTING ENVIRONMENT

(75) Inventors: Zhixue Wu, Cambridge (GB); Robertus Johannes van der Linden, Cambridge (GB); David John Otway, Cambridge (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 1155 days.

(21) Appl. No.: 12/487,110

(22) Filed: Jun. 18, 2009

(65) Prior Publication Data

US 2010/0325644 A1    Dec. 23, 2010

(51) Int. Cl.
- *G06F 13/00*   (2006.01)
- *G06F 9/44*    (2006.01)
- *G06F 9/445*   (2006.01)
- *G06F 9/455*   (2006.01)

(52) U.S. Cl.
CPC .................................. *G06F 9/4411* (2013.01)
USPC ........... 719/321; 717/168; 717/169; 717/170; 717/171; 717/172; 718/1

(58) Field of Classification Search
None
See application file for complete search history.

(56) References Cited

U.S. PATENT DOCUMENTS

| | | | |
|---|---|---|---|
| 6,230,118 B1* | 5/2001 | Bader et al. ..................... | 703/24 |
| 7,797,507 B2* | 9/2010 | Tago ............................. | 711/203 |
| 7,802,082 B2* | 9/2010 | Kruse et al. ..................... | 713/1 |
| 7,979,869 B2* | 7/2011 | Manczak et al. .............. | 719/327 |
| 8,015,383 B2* | 9/2011 | Shultz et al. .................. | 711/170 |
| 2003/0195995 A1* | 10/2003 | Tabbara ......................... | 709/313 |
| 2008/0209414 A1* | 8/2008 | Stein .............................. | 717/173 |
| 2008/0301770 A1* | 12/2008 | Kinder ............................ | 726/2 |
| 2008/0320500 A1* | 12/2008 | Li et al. ......................... | 719/324 |

(Continued)

FOREIGN PATENT DOCUMENTS

WO    WO-2007/149671 A2    12/2007

OTHER PUBLICATIONS

Anil Madhavapeddy: "Blogs for Anil Madhavapeddy", Citrix Community—The Citrix Blog, Sep. 17, 2008, XP002597274 Retrieved from the Internet: URL: http://community.citrix.com/blogs/citrite/anilma [retrieved on Aug. 19, 2010] Hyperlink "high-speed drivers" in article "Installing Ubuntu on XenServer".

(Continued)

*Primary Examiner* — H S Sough
*Assistant Examiner* — Phuong Hoang
(74) *Attorney, Agent, or Firm* — Foley and Lardner LLP; John D. Lanza

(57) ABSTRACT

A system for importing, from a host computer, a device driver into a guest computing environment provided by an external media device which does not include the device driver, includes a first computing environment, a second computing environment, a device discovery agent, a device driver discovery agent, and a device driver installation agent. A device driver associated with a device available to a first computing environment is installed on a computing device. The second computing environment is executed by a virtual machine on the computing device, based upon data retrieved from an external media device. The device discovery agent identifies a device available to the second computing environment. The device driver discovery agent determines that the installed device driver is associated with the device available to the second computing environment. The device driver installation agent imports the installed device driver into the second computing environment without user input.

11 Claims, 7 Drawing Sheets

(56) References Cited

U.S. PATENT DOCUMENTS

| | | | |
|---|---|---|---|
| 2009/0089815 A1 | 4/2009 | Manczak et al. | |
| 2009/0119684 A1* | 5/2009 | Mahalingam et al. | 719/324 |
| 2009/0144725 A1* | 6/2009 | Vrhel Jr. | 717/174 |

OTHER PUBLICATIONS

Barham P et al: "Xen and the Art of Virtualization" Proceedings of the ACM Symposium on Operating Systems Principles, XX, XX Oct. 1, 2003, pp. 164-177, XP002298786 Retrieved from the Internet: URL:http://portal.acm.org/citation.cfm?id=945462.

International Search Report for PCT/US2010/039151 mailed Sep. 10, 2010.

Keir Fraser: "Progressive paravirtualization" XenSource, Jul. 2, 2008, XP002597273 Retrieved from the Internet: URL: http://xen.org/files/summit_3/xen-pv-drivers.pdf[retrieved on Aug. 19, 2010].

Lin Tan et al: "iKernel: Isolating Buggy and Malicious Device Drivers Using Hardware Virtualization Support" Sep. 1, 2007, Dependable, Autonomic and Secure Computing, 2007. DASC 2007, Third IEEE International Symposium on, IEEE, Piscataway, NJ, USA, pp. 134-144, XP031148912, ISBN: 978-0-7695-2985-1, Section 3.1 p. 136-p. 137,col. 1, line 25.

EPO Communication on 10725947.5 dated Jan. 27, 2012.

International Preliminary Report on Patentability for PCT/US2010/039151 mailed Jan. 5, 2012.

Written Opinion for PCT/US2010/039151 mailed Sep. 10, 2010.

* cited by examiner

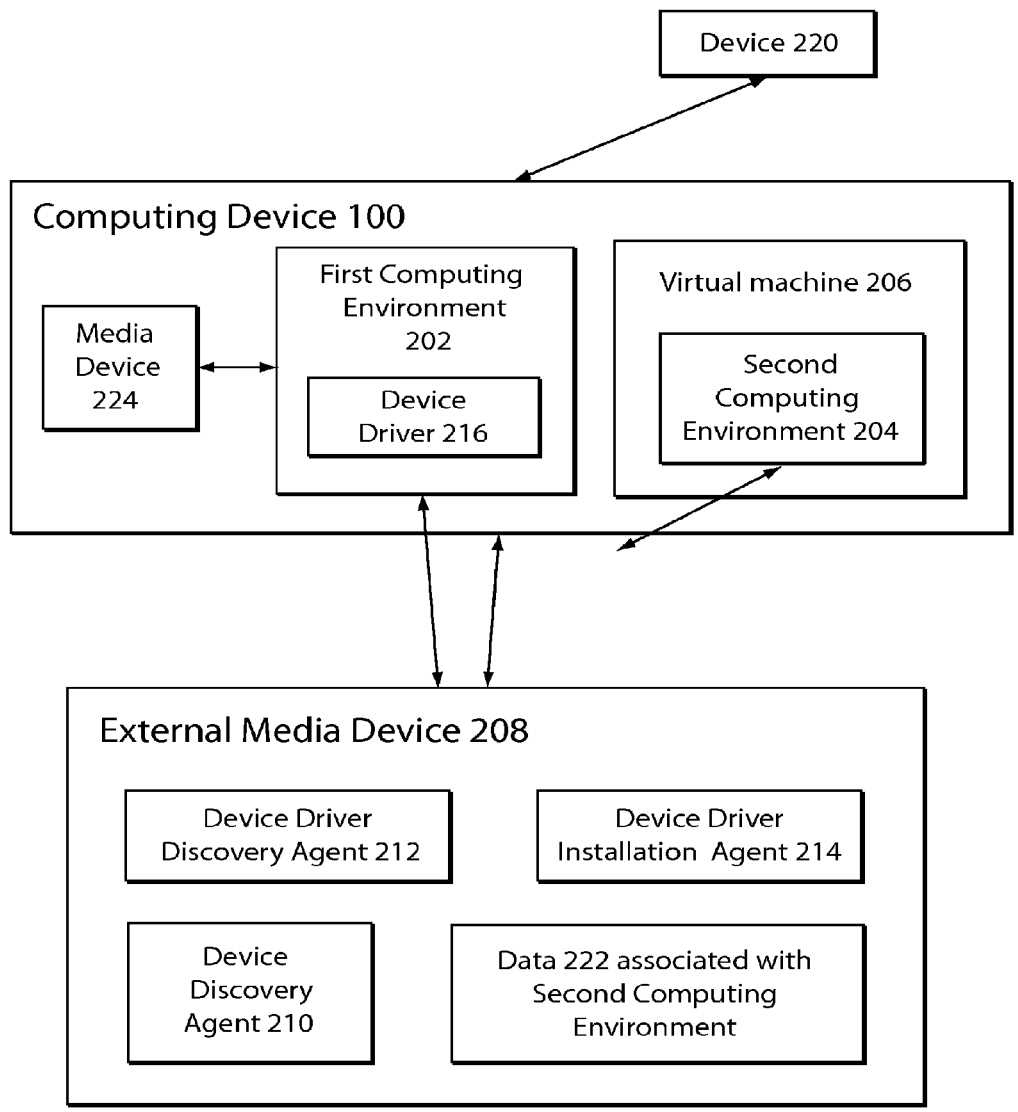

METHODS AND SYSTEMS FOR IMPORTING A DEVICE DRIVER INTO A GUEST COMPUTING ENVIRONMENT

FIELD OF THE INVENTION

The present disclosure relates to methods and systems for importing device drivers. In particular, the present disclosure relates to methods and systems for importing a device driver into a guest computing environment on a host computer, the guest computing environment provided by an external media device that does not include the device driver.

BACKGROUND OF THE INVENTION

In some environments, an external media device—such as, for example, a USB memory stick, an external disk drive, a DVD disk, a network-accessible computing device, or network-accessible storage device—stores a computing environment that a user may access from a computing device. Such a computing environment may include an operating system image as well as applications, files, and data, including user data. In a typical environment, a host computing device retrieves data (such as an operating system image) from the external media device and executes the operating system retrieved from the external media device instead of an operating system provided by the host computing device. Such environments typically allow a user to access a computing environment from different physical locations—such as from a work site, a home, or a public location, such as from a machine at a client site or an Internet café—without leaving potentially sensitive data on different host machines.

One drawback to accessing a computing environment stored on an external media device is that the operating system image typically needs to include all the information an operating system relies upon to execute on any given host machine. However, different host machines generally have different sets of hardware devices made by different manufacturers; different devices frequently require different device drivers in order to work properly. Because the operating system images are typically generated without knowledge of a hardware configuration of a host machine, one operating system image must work with many different kinds of hardware devices. Should the operating system image not include a device driver for a device on a host machine, the user will typically be asked to provide one. However, identifying and retrieving the needed driver may be a time-consuming or challenging project, which may result in a sub-optimal user experience.

One solution is to attempt to store, in the operating system image, drivers for all devices. However, it is typically infeasible to pre-install or package drivers for all devices in the operating system image due to the wide variety of available devices and manufacturers. Additionally, it may be expensive or impractical to store large operating system images on external media devices—for example, large operating system images that require additional space on a storage area network may necessitate the acquisition of additional storage devices, or, in the case of DVDs or memory sticks, may result in images that are too large to store on a single external media device.

BRIEF SUMMARY OF THE INVENTION

In one aspect, a system provides functionality for locating a required driver in a non-executing operating system image of a host machine, and dynamically installing the required driver into an executing guest operating system, without the need for user input. In another aspect, a method for importing a device driver into a guest computing environment on a host computer, the guest computing environment provided by an external media device that does not include the device driver, includes installing, onto a first computing environment on a computing device, a device driver for a device available to the first computing environment. The method includes retrieving, from an external media device, data associated with a second computing environment. The method includes executing, by a virtual machine on the computing device, the second computing environment, based on the retrieved data. The method includes identifying, by a device discovery agent, a device available to the second computing environment. The method includes determining, by a device driver discovery agent, that the device driver installed in the first computing environment is associated with the device available to the second computing environment. The method includes importing, by a device driver installation agent, without user input, the installed device driver into the second computing environment.

In another aspect, a system for importing a device driver into a guest computing environment on a host computer, the guest computing environment provided by an external media device that does not include the device driver. In brief overview, the system includes a device driver, a first computing environment, a second computing environment, a device discovery agent, a device driver discovery agent, and a device driver installation agent. The device driver is installed onto a first computing environment on a computing device. The device driver is associated with a device available to the first computing environment. The second computing environment is executed by a virtual machine on the computing device, based upon data retrieved from an external media device. The device discovery agent executes from the external media device and identifies a device available to the second computing environment. The device driver discovery agent executes from the external media device and determines that the device driver installed in the first computing environment is associated with the device available to the second computing environment. The device driver installation agent executes from the external media device and importing the installed device driver into the second computing environment without user input.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2 is a block diagram depicting one embodiment of a system for importing a device driver into a guest computing environment on a host computer, the guest computing environment provided by an external media device that does not include the device driver.

DETAILED DESCRIPTION OF THE INVENTION

Figure 1A:
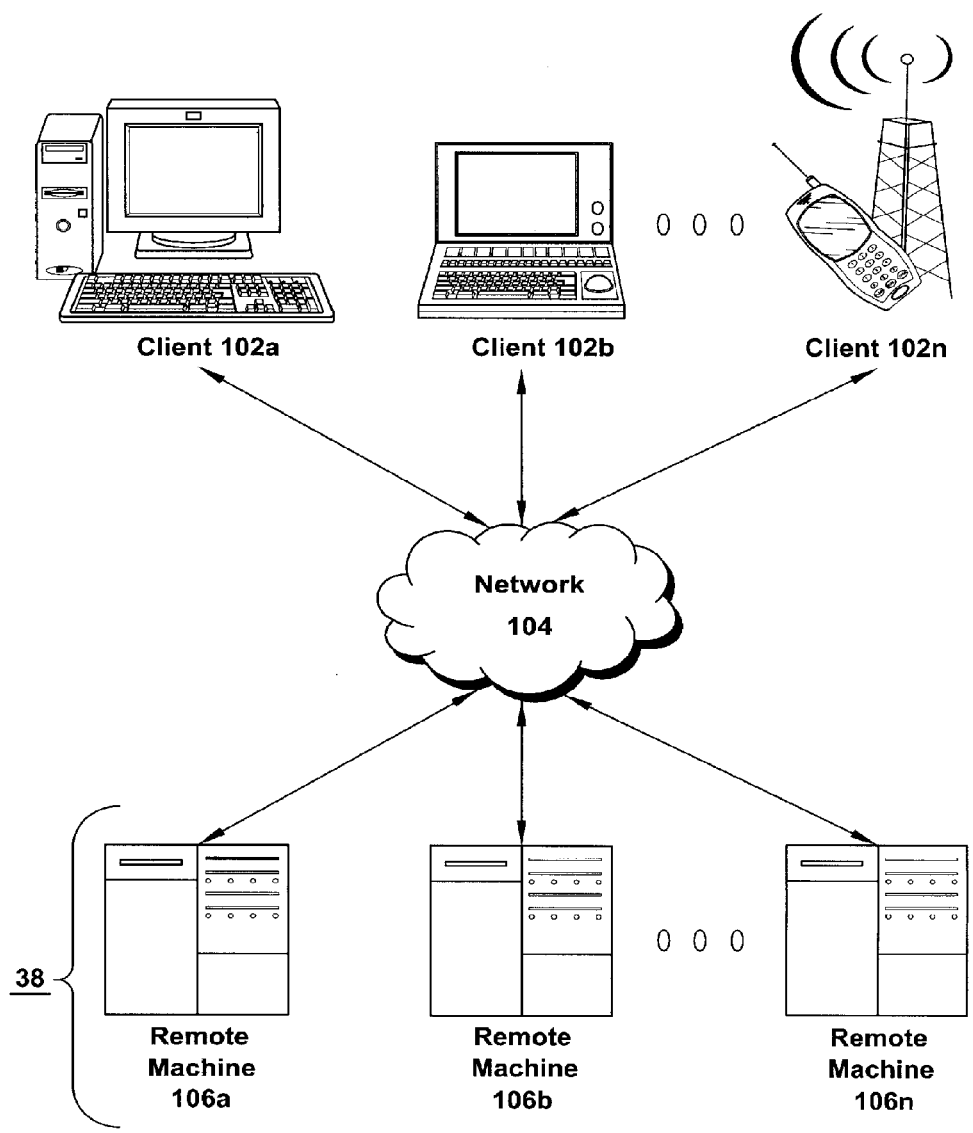
FIG. 1A is a block diagram depicting an embodiment of a network environment comprising client machines in communication with remote machines.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, WINDOWS 2003, WINDOWS 2008, manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a client 102. In other embodiments, a remote machine 106 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, and a desktop session in which one or more applications may execute.

In some embodiments, a client 102 communicates with a remote machine 106. In one embodiment, the client 102 communicates directly with one of the remote machines 106 in a server farm 38. In another embodiment, the client 102 executes a program neighborhood application to communicate with a remote machine 106 in a server farm 38. In some embodiments, the client 102 communicates with the remote machine 106 in the server farm 38 through a network 104. Over the network 104, the client 102 can, for example, request execution of various applications hosted by the remote machines 106a-106n in the server farm 38 and receive output of the results of the application execution for display. In some embodiments, a first remote machine 106a (which may be referred to as a master node) provides the functionality required to identify and provide address information associated with a second remote machine 106b hosting a requested resource.

In one embodiment, the remote machine 106 provides the functionality of a web server. In another embodiment, the remote machine 106a receives requests from the client 102, forwards the requests to a second remote machine 106b and responds to the request by the client 102 with a response to the request from the remote machine 106b. In still another embodiment, the remote machine 106a acquires an enumeration of applications available to the client 102 and address information associated with a remote machine 106b hosting an application identified by the enumeration of applications. In yet another embodiment, the remote machine 106 presents the response to the request to the client 102 using a web interface. In one embodiment, the client 102 communicates directly with the remote machine 106 to access the identified application. In another embodiment, the client 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a remote machine 106. In other embodiments, the remote machine 106 may display output to the client 102 using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
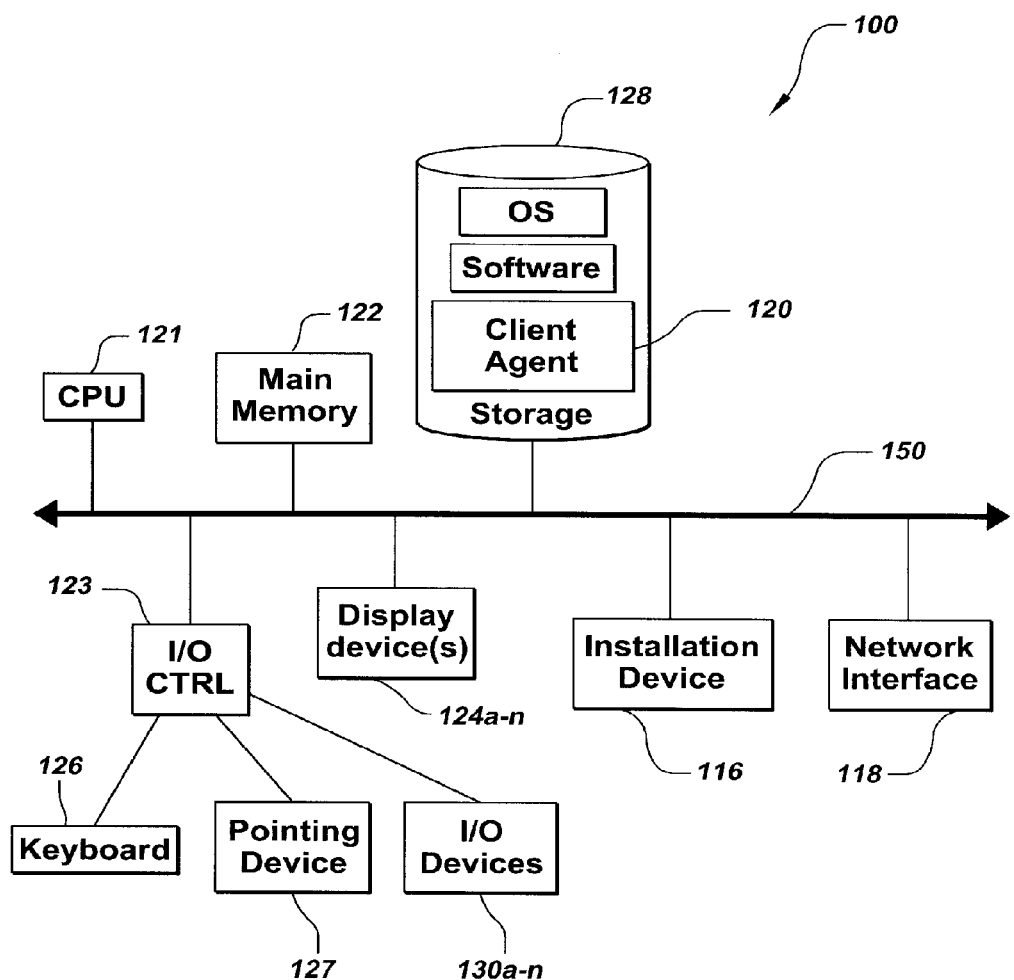
FIGS. 1B-1E are block diagrams depicting embodiments of computers useful in connection with the methods and systems described herein.
Figure 1C:
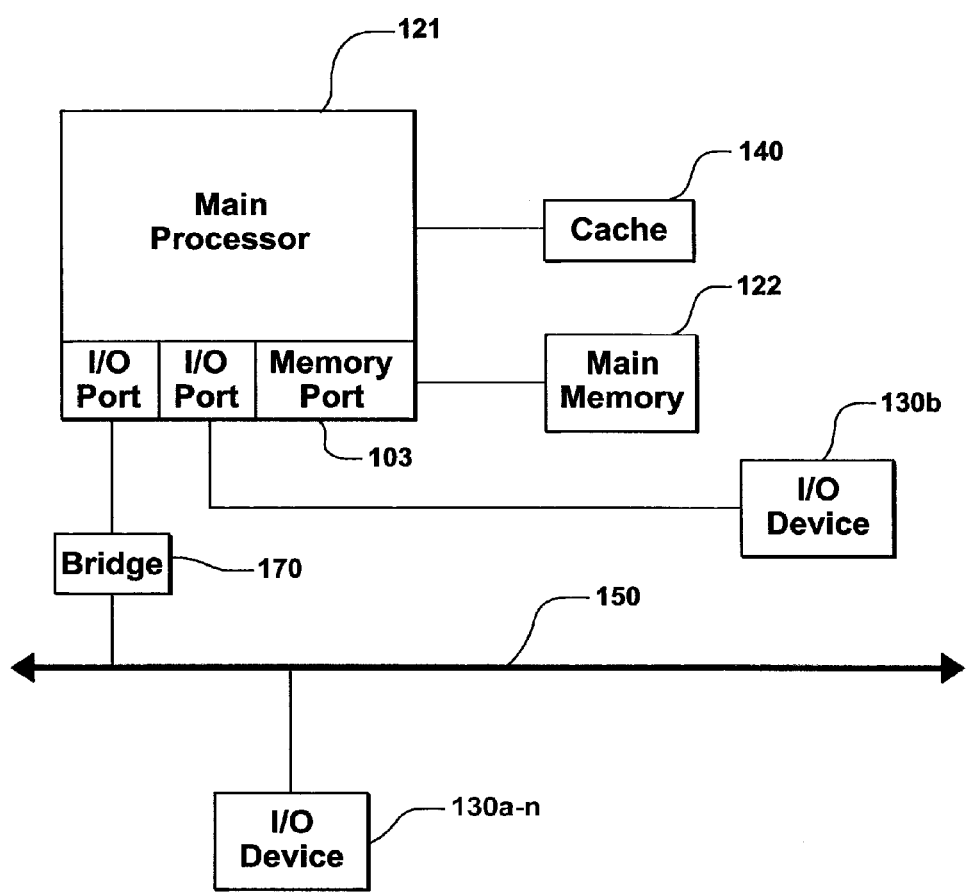

The client 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
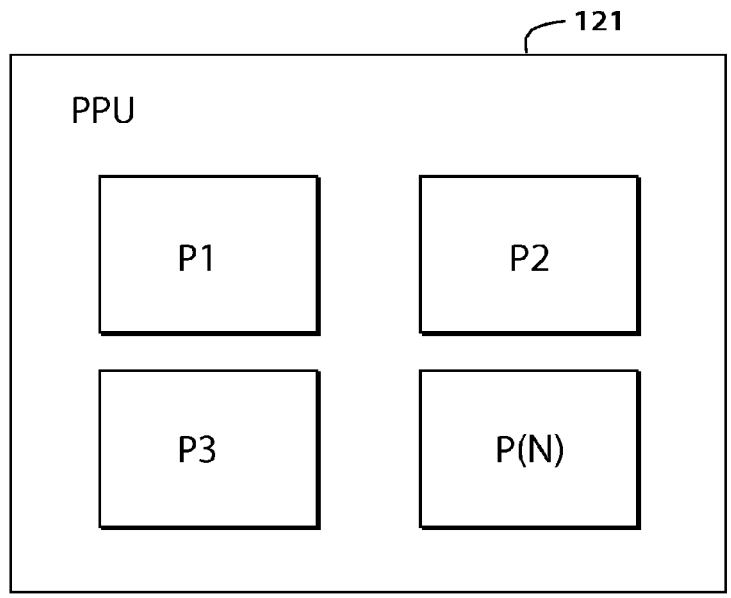

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
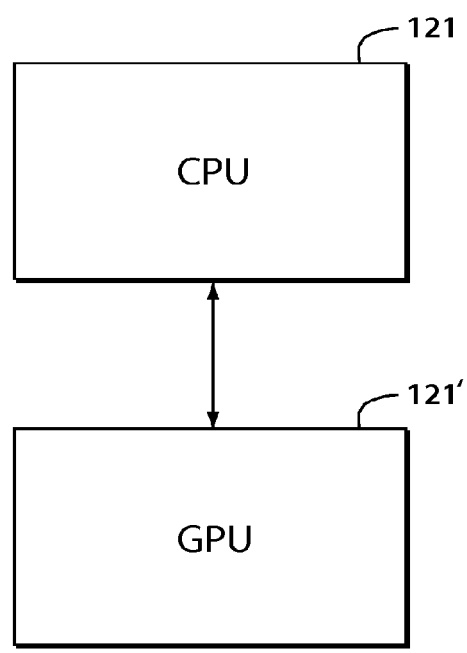

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Figure 1F:
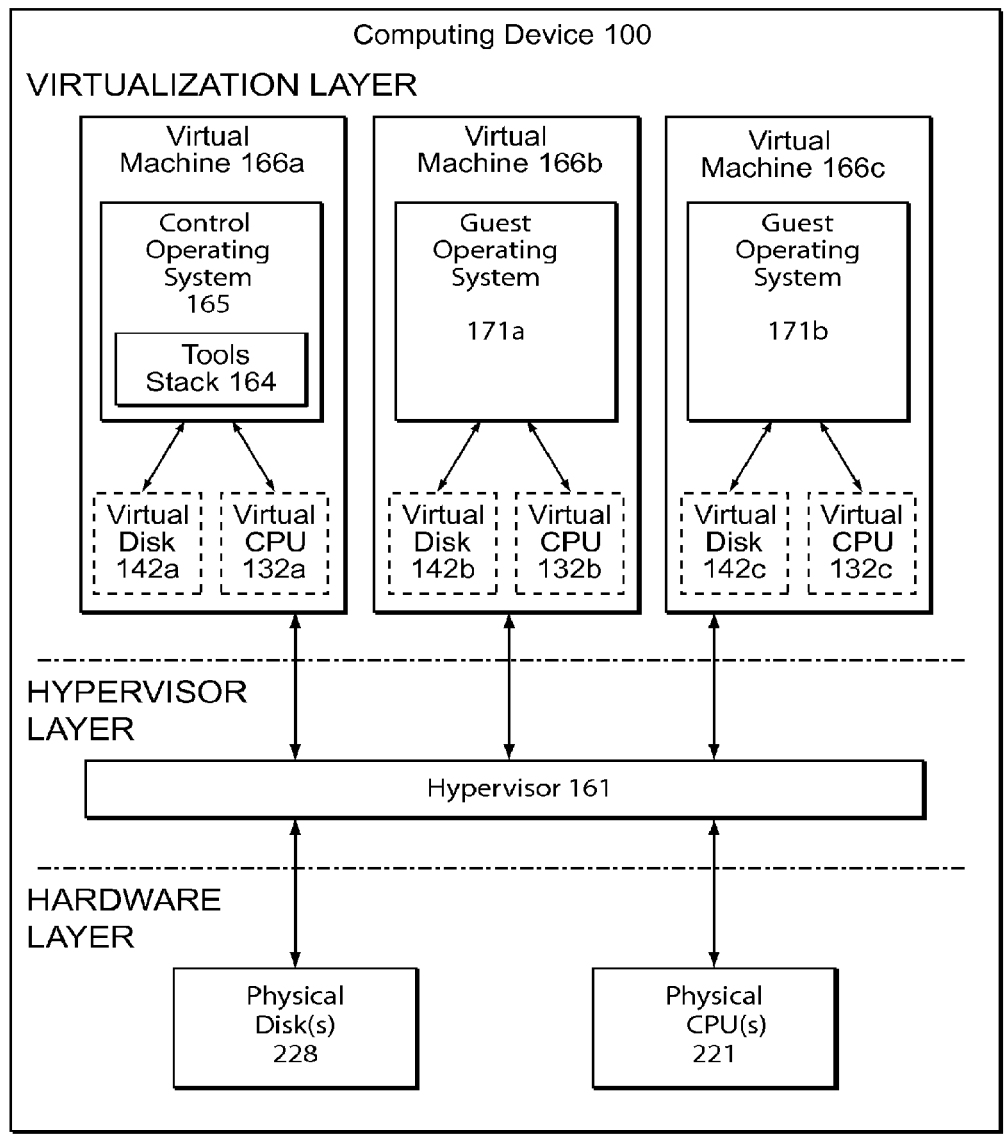
FIG. 1F is a block diagram depicting one embodiment of a virtualization environment.

Referring now to FIG. 1F, a block diagram depicts one embodiment of a virtualization environment. In brief overview, a computing device 100 includes a hypervisor layer, a virtualization layer, and a hardware layer. The hypervisor layer includes a hypervisor 161 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 171 and a plurality of virtual resources allocated to the at least one operating system 171. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 171 may be referred to as a virtual machine 166. A virtual machine 166 may include a control operating system 165 in communication with the hypervisor 161 and used to execute applications for managing and configuring other virtual machines on the computing device 100.

Referring now to FIG. 1F, and in greater detail, a hypervisor 161 may provide virtual resources to an operating system in any manner that simulates the operating system having access to a physical device. A hypervisor 161 may provide virtual resources to any number of guest operating systems 171a, 171b (generally 171). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 161 executes within an operating system executing on a computing device. In one of these embodiments, a computing device executing an operating system and a hypervisor 161 may be said to have a host operating system (the operating system executing on the computing device), and a guest operating system (an operating system executing within a computing resource partition provided by the hypervisor 161). In other embodiments, a hypervisor 161 interacts directly with hardware on a computing device, instead of executing on a host operating system. In one of these embodiments, the hypervisor 161 may be said to be executing on "bare metal," referring to the hardware comprising the computing device.

In some embodiments, a hypervisor 161 may create a virtual machine 166a-c (generally 166) in which an operating system 171 executes. In one of these embodiments, for example, the hypervisor 161 loads a virtual machine image to create a virtual machine 166. In another of these embodiments, the hypervisor 161 executes an operating system 171 within the virtual machine 166. In still another of these embodiments, the virtual machine 166 executes an operating system 171.

In some embodiments, the hypervisor 161 controls processor scheduling and memory partitioning for a virtual machine 166 executing on the computing device 100. In one of these embodiments, the hypervisor 161 controls the execution of at least one virtual machine 166. In another of these embodiments, the hypervisor 161 presents at least one virtual machine 166 with an abstraction of at least one hardware resource provided by the computing device 100. In other embodiments, the hypervisor 161 controls whether and how physical processor capabilities are presented to the virtual machine 166.

A control operating system 165 may execute at least one application for managing and configuring the guest operating systems. In one embodiment, the control operating system 165 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 161 executes the control operating system 165 within a virtual machine 166 created by the hypervisor 161. In still another embodiment, the control operating system 165 executes in a virtual machine 166 that is authorized to directly access physical resources on the computing device 100. In some embodiments, a control operating system 165a on a computing device 100a may exchange data with a control operating system 165b on a computing device 100b, via communications between a hypervisor 161a and a hypervisor 161b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 165 executes in a virtual machine 166 that is authorized to interact with at least one guest operating system 171. In another embodiment, a guest operating system 171 communicates with the control operating system 165 via the hypervisor 161 in order to request access to a disk or a network. In still another embodiment, the guest operating system 171 and the control operating system 165 may communicate via a communication channel established by the hypervisor 161, such as, for example, via a plurality of shared memory pages made available by the hypervisor 161.

In some embodiments, the control operating system 165 includes a network back-end driver for communicating directly with networking hardware provided by the computing device 100. In one of these embodiments, the network back-end driver processes at least one virtual machine request from at least one guest operating system 171. In other embodiments, the control operating system 165 includes a block back-end driver for communicating with a storage element on the computing device 100. In one of these embodiments, the block back-end driver reads and writes data from the storage element based upon at least one request received from a guest operating system 171.

In one embodiment, the control operating system 165 includes a tools stack 164. In another embodiment, a tools stack 164 provides functionality for interacting with the hypervisor 161, communicating with other control operating systems 165 (for example, on a second computing device 100b), or managing virtual machines 166b, 166c on the computing device 100. In another embodiment, the tools stack 164 includes customized applications for providing improved management functionality to an administrator of a virtual machine farm. In some embodiments, at least one of the tools stack 164 and the control operating system 165 include a management API that provides an interface for remotely configuring and controlling virtual machines 166 running on a computing device 100. In other embodiments, the control operating system 165 communicates with the hypervisor 161 through the tools stack 164.

In one embodiment, the hypervisor 161 executes a guest operating system 171 within a virtual machine 166 created by the hypervisor 161. In another embodiment, the guest operating system 171 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 171, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 161; in such an embodiment, the driver is typically aware that it executes within a virtualized environment.

In another embodiment, the guest operating system 171, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 165, as described above Referring now to FIG. 2, a block diagram depicts one embodiment of a system for importing a device driver into a guest computing environment on a host computer, the guest computing environment provided by an external media device which does not include the device driver. In brief overview, the system includes a first computing environment 202, a second computing environment 204, a virtual machine 206, a device discovery agent 210, a device driver discovery agent 212, a device driver installation agent 214, a device driver 216, a device 220, data 222 associated with the second computing environment, an external media device 208, a media device 224, and a computing device 100. The device driver 216 is installed onto the first computing environment 202 on a computing device 100. The device driver 216 is associated with a device 220 available to the first computing environment 202. A virtual machine 206 executes the second computing environment 204 on the computing device 100 based upon data 222 retrieved from the external media device 208. The device discovery agent 210 executes from the external media device 208 and identifies a device 220 available to the second computing environment 204. The device driver discovery agent 212 executes from the external media device 208 and determines that the device driver 216 installed in the first computing environment 202 is associated with the device 220 available to the second computing environment. The device driver installation agent 214 executes from the external media device 208 and imports the installed device driver 216 into the second computing environment 204 without user input.

Referring now to FIG. 2, and in greater detail, a device driver 216 is installed onto the first computing environment 202 on a computing device 100. In one embodiment, the first computing environment 202 is an operating system executed by the computing device 100. In another embodiment, the first computing environment 202 is an operating system executed by a virtual machine executing on the computing device 100. In still another embodiment, a device is a peripheral device (including, without limitation, a printer, a scanner, a network connectivity device (such as a modem, network interface card, or other device for connecting to a physical or wireless network), a media device such as a disk drive or tape drive, and an input/output device such as a microphone, speaker, keyboard, pointing device, camera, monitor or other device) connected to the computing device 100 either physically (including both external devices connected to the computing device 100 and internal devices embedded into the computing device 100) or wirelessly. In some embodiments, the computing device 100 is referred to as a host machine 100 or a host computing device. In other embodiments, the computing device 100 is a computing device 100 as described above in connection with FIGS. 1A-E.

In one embodiment, a media device 224 stores data used by the computing device 100 to execute the first computing environment 202. In another embodiment, the media device 224 is a component on the computing device 100; for example, the media device 224 may be a memory 122 as discussed above in connection with FIGS. 1B-1C. In still another embodiment, the media device 224 is a component external to the computing device 100, such as a network-accessible drive, or a second external media device 208.

In one embodiment, the computing device 100 retrieves the data 222 from an external media device 208 residing on a network accessible to the computing device 100. In another embodiment, for example, the external media device 208 may be a storage device in a storage area network. In still another embodiment, the external media device 208 is a second computing device 100, such as a computing device 106, residing on a network accessible to the computing device 100. In still even another embodiment, the external media device 208 is a flash memory data storage device. In yet another embodiment, the external media device 208 is a DVD disc.

A virtual machine 206 executes the second computing environment 204 on the computing device 100, based upon data 222 retrieved from the external media device 208. In one embodiment, the system includes a virtual machine image associated with the second computing environment 204 and retrieved from the external media device 208. In another embodiment, the data 222 includes a virtual machine image used to execute the virtual machine 206. In another embodiment, the data 222 includes an operating system image and the second computing environment 204 is an operating system executed by the virtual machine 206.

In some embodiments, the external media device 208 includes an agent that executes upon establishment of a connection between the external media device 208 and a host computing device 100. In one of these embodiments, the agent retrieves, from an external media device 208 residing on a network available to the host computing device 100, data associated with the second computing environment 204. In another of these embodiments, the agent retrieves, from a second computing device 100b residing on a network available to the host computing device 100, data associated with the second computing environment 204. In still another of these embodiments, the agent retrieves, from the external media device 208, a virtual machine image associated with the second computing environment 204. In yet another of these embodiments, the agent directs the execution by the host computing device 100 of the second computing environment 204 based upon retrieved data 222. In other embodiments, the external media device 208 includes a file that automatically executes upon establishment of a connection between the external media device 208 and a host computing device 100; such a file may be referred to as an autorun file.

The device discovery agent 210 executes on the external media device 208 and identifies a device 220 available to the second computing environment 204. In one embodiment, the identified device 220 is a device 220 that is also available to the first computing environment 202. In some embodiments, the device discovery agent 210 includes a communications component for querying device 220 to receive an identification of the device 220.

The device driver discovery agent 212 executes from the external media device 208 and determines that the device driver 216 installed in the first computing environment 202 is associated with the device 220 available to the second computing environment. In one embodiment, by way of example, the computing device 100 accesses data stored on the external media device 208 to execute the device driver discovery agent 212. In another embodiment, the device driver discovery agent 212 includes a component for accessing a directory storing driver-related information and extracting an identification of a device driver.

The device driver installation agent 214 executes from the external media device 208 and imports the installed device driver 216 into the second computing environment 204 without user input. In one embodiment, by way of example, the computing device 100 accesses data stored on the external media device 208 to execute the device driver installation agent 214. In another embodiment, the device driver installation agent 214 is in communication with the device driver discovery agent 212. In still another embodiment, the device driver installation agent 214 is in communication with the device discovery agent 210.

Figure 3:
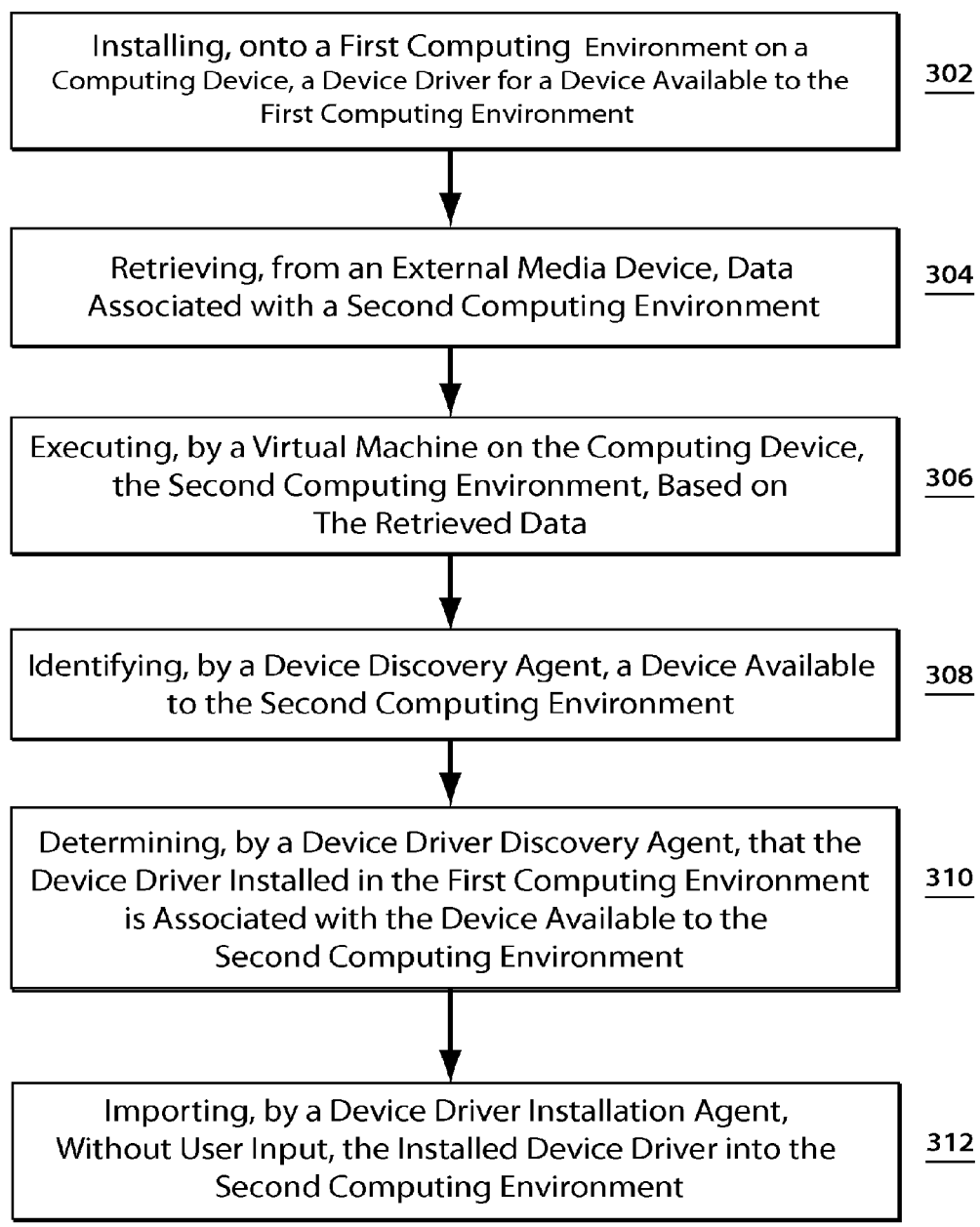
FIG. 3 is a flow diagram depicting one embodiment of a method for importing a device driver into a guest computing environment on a host computer, the guest computing environment provided by an external media device that does not include the device driver.

Referring now to FIG. 3, a flow diagram depicts one embodiment of a method for importing a device driver into a guest computing environment on a host computer, the guest computing environment provided by an external media device which does not include the device driver. In brief overview, the method 300 includes installing, onto a first computing environment on a computing device, a device driver for a device available to the first computing environment (302). The method includes retrieving, from an external media device, data associated with a second computing environment (304). The method includes executing, by a virtual machine on the computing device, the second computing environment, based on the retrieved data (306). The method includes identifying, by a device discovery agent, a device available to the second computing environment (308). The method includes determining, by a device driver discovery agent, that the device driver installed in the first computing environment is associated with the device available to the second computing environment (310). The method includes importing, by a device driver installation agent, without user input, the installed device driver into the second computing environment (312).

A device driver for a device available to a first computing environment on a computing device is installed onto the first computing environment (302). In one embodiment, a user installs the device driver 216 to access the device 220 by executing an installation application and completing an installation process. In another embodiment, the device driver 216 was pre-installed on the first computing environment.

Data associated with a second computing environment is retrieved from an external media device (304). In one embodiment, the data 222 is retrieved from an external media device residing on a network available to the host computing device 100. In another embodiment, the data 222 is retrieved from a second computing device residing on a network available to the host computing device 100. In still another embodiment, a virtual machine image associated with the second computing environment 204 is retrieved from the external media device 208. In yet another embodiment, an operating system image associated with the second computing environment 204 is retrieved from the external media device 208.

A virtual machine on the computing device executes the second computing environment, based on the retrieved data (306). In one embodiment, the host computing device 100 executes the second computing environment 204 without use of a virtual machine, based on the retrieved data 222. In another embodiment, the host computing device 100 executes the second computing environment 204 in an isolation environment, based on the retrieved data 222. In still another embodiment, a hypervisor provided by the host computing device 100 executes a virtual machine within which to execute the second computing environment 204. In some embodiments, execution of the first computing environment 202 is terminated before execution of the second computing environment 204 begins. In other embodiments, the virtual machine 206 executes a guest operating system providing access to the second computing environment 204. In one of these embodiments, the guest operating system is the second computing environment 204. In another of these embodiments, the virtual machine 206 allocates, to the guest operating system, access to an internal hard drive of the host computing device 100.

A device discovery agent identifies a device available to the second computing environment (308). In one embodiment, the device discovery agent 210 identifies the device available to the first computing environment as available to the second computing environment. In some embodiments, an initialization process occurs (which may be referred to as a boot-up process) during which the device discovery agent 210 scans the hardware of the computing device 100 to identify a device 220.

In some embodiments, the device discovery agent 210 identifies a device 220 accessible to the second computing environment 204 but for which no device driver is included in the second computing environment 204 or in the data 222 associated with the second computing environment 204 and stored by the external media device 208. In one of these embodiments, the device discovery agent 210 accesses an enumeration of devices provided by the computing device 100 to identify a device 220. In another of these embodiments, the device discovery agent 210 determines, for each device identified in the enumeration of devices, whether the enumerated device is available to the second computing environment 204. In still another of these embodiments, for example, the device discovery agent 210 applies a policy to determine whether the enumerated device is available to the second computing environment 204. In still even another of these embodiments, as another example, the device discovery agent 210 accesses a mapping of device types and permissions to determine the enumerated device is available to the second computing environment 204. In yet another of these embodiments, the device discovery agent 210 communicates with a device management component provided by the second computing environment 204 to determine whether the computing device 100 provides access to any of devices for which the second computing environment 204 does not include a driver. In other embodiments, the device discovery agent 210 transmits a request to the device driver discovery 212 for the driver.

A device driver discovery agent determines that the device driver installed in the first computing environment is associated with the device available to the second computing environment (310). In one embodiment, the device driver discovery agent 212 receives an identification of an available driver; for example, the device discovery agent 210 may transmit the identification—such as a device identifier or manufacturer name—to the device driver discovery agent 212. In another embodiment, the device driver discovery agent 212 retrieves, from a hard drive on the computing device 100, driver-related information associated with a device 220 available to the second computing environment 202. In still another embodiment, the device driver discovery agent 212 accesses a directory storing driver-related information including an identification of data needed to import the driver for the identified device 220; for example, the directory may store a file enumerating at least one file, registry key, setting, or other data or modification to data required to install the driver into the second computing environment 204, and an identification of a location in a computing environment for the enumerated data.

In some embodiments, by way of example, an operating system may store driver-related information in a file. In one of these embodiments, for example, the file may be in a directory generated and maintained by a WINDOWS XP operating system and the location of the file may be provided by a pathname including, by way of example and without limitation, "\WINDOWS\inf\*.inf", "\Windows\System32\*.INF", and "\Windows\inf\*.inf". In another of these embodiments, for example, the file may be in a directory generated and maintained by a WINDOWS 2003 operating system and the location of the file may be provided by a pathname including, by way of example and without limitation, "\Windows\inf\*.inf". In still another of these embodiments, for example, the file may be in a directory generated and maintained by a WINDOWS NT operating system and the location of the file may be provided by a pathname including, by way of example and without limitation, "\WINNT\inf\*.inf". In yet another of these embodiments, for example, the file may be in a directory generated and maintained by a WINDOWS VISTA operating system and the location of the file may be provided by a pathname including, by way of example and without limitation, "\Windows\inf\*.PNF" and "\Windows\inf\*.inf".

In one embodiment, the device driver discovery agent 212 determines that a device driver installed in a third computing environment on second computing device is associated with the device available to the second computing environment 204. In another embodiment, the device driver discovery agent 212 accesses a directory on the second computing device 100b storing driver-related information and retrieves at least one file required to import the driver for the identified device 220; for example, the device driver discovery agent 212 may access a directory accessible over a network 104. In some embodiments, the device driver discovery agent 212 transmits, to the device driver installation agent 214, an instruction to import the retrieved file.

A device driver installation agent imports, without user input, the installed device driver into the second computing environment (312). In one embodiment, the device driver installation agent 214 receives, from the device driver discovery agent 212, an identification of the device 220 and at least one file comprising the installed device driver 216. In another embodiment, the device driver installation agent 214 imports the device driver 216 into the second computing environment 204. In still another embodiment, the device driver installation agent 214 imports the device driver 216 into an operating system image, or other data 222, associated with the second computing environment 204 and stored on the external media device 208.

In some embodiments, the device driver installation agent 214 receives, from the device driver discovery agent 212, an identification of a directory storing driver-related information. In one of these embodiments, the device driver installation agent 214 accesses the identified directory to retrieve driver-related information. In another of these embodiments, the device driver installation agent 214 retrieves, from a directory storing driver-related information, an identification of a location of at least one file in a computing environment to import in order to install the driver. In still another of these embodiments, the device driver installation agent 214 retrieves, from a directory storing driver-related information, an identification of a location of at least one setting in a computing environment to modify in order to install the driver. In still even another of these embodiments, the device driver installation agent 214 retrieves, from a directory storing driver-related information, an identification of at least one modification to make to a registry in a computing environment in order to install the driver. In still another of these embodiments, the device driver installation agent 214 retrieves, from a directory storing driver-related information, an identification of at least one file to generate in a computing environment in order to install the driver. In yet another of these embodiments, the device driver installation agent 214 retrieves, from a directory storing driver-related information, an identification of at least one registry key to generate in a computing environment in order to install the driver.

In one embodiment, the device driver installation agent 214 copies a file, from a location identified by the retrieved driver-related information, to a corresponding location in the second computing environment. In another embodiment, the device driver installation agent 214 copies a registry key, from a location identified by the retrieved driver-related information, to a corresponding location in the second computing environment. In still another embodiment, the device driver installation agent 214 modifies a setting in a registry in the second computing environment, based upon a modification identified by the retrieved driver-related information. In still even another embodiment, the device driver installation agent 214 modifies a file in the second computing environment, based upon a modification identified by the retrieved driver-related information.

In some embodiments, the methods and systems described herein providing functionality for importing a device driver for a device from a host computing device into a computing environment executed based upon an image stored on an external media device. In one of these embodiments, a required device driver previously installed on the host computing device may be imported to the computing environment without requiring the image stored on the external media device to include a copy of the device driver. In another of these embodiments, this allows a user of the computing environment to access an available device via its intended device driver without completing a typical driver installation process requiring user input.

The following illustrative examples show how the methods and systems discussed above may be used for importing a device driver into a guest computing environment on a host computer, the guest computing environment provided by an external media device that does not include the device driver. These examples are meant to illustrate and not to limit the invention.

EXAMPLE 1

In one embodiment, the first computing environments 202 is a native operating system executing on the host computing device 100. In another embodiment, the first computing environment 202 is a guest operating system executed by a virtual machine executing on the host computing device 100. In still another embodiment, a user of the host computing device 100 identifies an available device—such as a printer, modem, monitor, network accessible storage element, or other peripheral device—and installs a device driver 216 on the host computing device 100 for accessing and interacting with the available device. In yet another embodiment, the host computing device 100 may be used for personal purposes, such as a computer in the user's home environment.

In one embodiment, the second computing environment is a desktop environment providing access to applications, files, or other resources. In another embodiment, the external media device 208 stores an image (such as a desktop image, an operating system image, or a drive image) used to execute the second computing environment 204. In still another embodiment, a virtual machine 206 executing on the host computing device 100 accesses the image to execute the second computing environment 204 and provide the user with access to the desktop environment. In yet another embodiment, the second computing environment 204 is, by way of example, and without limitation, a corporate desktop environment generated and maintained by a user's employer, client, partner, or other corporate entity providing the user with remote access to corporate applications, files, or other resources, which may include potentially sensitive data.

In some embodiments, by allowing the user to access the second computing environment 204 from the host computing device 100, the user gains access to corporate resources he or she may not otherwise have access to (for example, because the host computing device 100 is typically used for personal purposes and does not justify the expense of acquiring corporate resources) while leveraging existing devices and maintaining the resources in an isolated, secured environment. In one of these embodiments, by importing an existing device driver from the host computing device 100 to the second computing environment 204, the user of the second computing environment can access available devices without the expense or practical challenges of storing large operating system images on external media devices. In another of these embodiments, by importing the existing device driver without requiring user input, the process of importing the device driver occurs seamlessly and without requiring the user to provide additional information about the location of driver-related information to a typical installation process.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for importing a device driver into a guest computing environment on a host computer, the guest computing environment provided by an external media device which does not include the device driver, it will now become apparent to one of skill in the art that other embodiments incorporating the concepts of the invention may be used. Therefore, the disclosure should not be limited to certain embodiments, but rather should be limited only by the spirit and scope of the following claims.

What is claimed is:

1. A method comprising:
    installing, onto a first computing environment on a computing device, a device driver for a device available to the first computing environment;
    retrieving, from an external media device that does not include the device driver, data associated with a second computing environment;
    retrieving, from the external media device, a virtual machine image associated with the second computing environment;
    executing, by a virtual machine on the computing device, the second computing environment, based on the retrieved data;
    identifying, by a device discovery agent, a device available to the second computing environment;
    determining, by a device driver discovery agent, that the device driver installed in the first computing environment is associated with the device available to the second computing environment; and
    importing, by a device driver installation agent, without user input, a copy of the device driver from the first computing environment into the second computing environment.

2. The method of claim 1, wherein executing comprises executing, by an isolation environment on the computing device, the second computing environment, based on the retrieved data.

3. The method of claim 1, wherein the external media device resides on a network available to the computing device.

4. The method of claim 1 further comprising retrieving, from a second computing device residing on a network available to the computing device, data associated with the second computing environment.

5. The method of claim 1 further comprising identifying, by the device discovery agent, the device available to the first computing environment as available to the second computing environment.

6. The method of claim 1 further comprising determining that a device driver installed in a third computing environment on a second computing device is associated with the device available to the second computing environment.

7. A system comprising:
    means for installing onto a first computing environment on a computing device, a device driver for a device available to the first computing environment;
    means for retrieving, from an external media device that does not include the device driver, data associated with a second computing environment;
    means for retrieving, from the external media device, a virtual machine image associated with the second computing environment;
    means for executing, by a virtual machine on the computing device, the second computing environment, based on the retrieved data;
    means for identifying, by a device discovery agent, a device available to the second computing environment;
    means for determining, by a device driver discovery agent, that the device driver installed in the first computing environment is associated with the device available to the second computing environment; and
    means for importing, by a device driver installation agent, without user input, a copy of the device driver from the first computing environment into the second computing environment.

8. The system of claim 7, wherein the external media device is residing on a network available to the computing device.

9. The system of claim 7 further comprising means for retrieving, from a second computing device residing on a network available to the computing device, data associated with the second computing environment.

10. The system of claim 7 further comprising means for identifying, by the device discovery agent, the device available to the first computing environment as available to the second computing environment.

11. The system of claim 7 further comprising means for determining that a second device driver installed in a third computing environment on second computing device is associated with the device available to the second computing environment.

* * * * *